United States Patent Office 3,770,842
Patented Nov. 6, 1973

3,770,842
METHOD OF SEPARATING ALIPHATICALLY UNSATURATED HYDROCARBONS BY CONTACTING SAID HYDROCARBONS WITH A SOLID, WATER-INSOLUBLE, SEMI-PERMEABLE FILM MEMBRANE
Edward F. Steigelmann and Robert D. Hughes, Park Forest, Ill., assignors to Standard Oil Company, Chicago, Ill.
No Drawing. Filed June 29, 1972, Ser. No. 267,540
Int. Cl. C07c 9/00, 11/12
U.S. Cl. 260—677 A       14 Claims

ABSTRACT OF THE DISCLOSURE

There is described the separation of aliphatically-unsaturated hydrocarbons from gaseous mixtures by the combined use of flooded-cell, liquid barrier permeation and metal complexing techniques. The liquid barrier is disposed as a continuous, distinct liquid phase in contact with a film membrane, and the barrier contains complex-forming metal ions in aqueous solution. The hydrocarbon feed gas is contacted with the liquid barrier containing a surface-active agent in solution in the liquid barrier. The surface-active agent serves to improve the selectivity of the separation. The metal ions in the liquid barrier may be, for example, noble metal, nickel, mercuric, cuprous or other metal ions, and mixtures of the metal ions, with or without other cations, may be used. The separation of ethylene from ethane and methane is of particular interest.

---

This invention relates to the separation of aliphatically-unsaturated hydrocarbons from gaseous mixtures containing the hydrocarbons to be separated, along with another material. More particularly, this invention is concerned with the separation of aliphatically-unsaturated hydrocarbons by the combined use of flooded-cell, liquid barrier permeation and metal complexing techniques. The selectivity of the separation is enhanced by providing a surface-active agent in solution in the liquid barrier. The invention is especially useful for separating ethylene from gaseous mixtures containing it, other hydrocarbons, for example, one or both of ethane and methane, and with or without hydrogen.

There is considerable commercial interest in separating various aliphatically-unsaturated hydrocarbons from mixtures containing them. These unsaturated hydrocarbons are reactive materials that serve in various roles, generally as intermediates in chemical syntheses. A number of the unsaturated hydrocarbons are employed as monomers in the formation of polymers and in this regard, olefins such as ethylene, propylene, butadiene and isoprene are well known. These olefins, as well as other unsaturated materials, for instance, acetylene, are also used to form relatively low molecular weight products.

The aliphatically-unsaturated hydrocarbons are most often available on a commercial basis in admixture with other chemical compounds, frequently other hydrocarbons. These unsaturated hydrocarbon-containing streams are usually byproducts of chemical syntheses or separation processes. When the hydrocarbon streams are liquid under normal conditions or can readily be made so, ordinary distillation techniques can be used to separate the hydrocarbon components providing they have sufficiently different boiling points for the process to be economically feasible. Especially when the hydrocarbon mixtures contain materials having close boiling points, which is often the case with hydrocarbons of the same number of carbon atoms or having a difference of only one carbon atom, distillation may not be an attractive separation procedure. In such cases, more costly processes are often used and involve operations such as solvent extraction or extractive distillation which entail considerable expense, if indeed they are technically feasible in a given situation.

When the mixture containing the aliphatically-unsaturated hydrocarbon is in an essentially gaseous state at normal or ambient conditions of temperature and pressure, separation of the desired component from the mixture may be even more troublesome. In these situations, cryogenic processes may be used, but they are expensive. The components of these normally gaseous mixtures may not even have particularly close boiling points, but nevertheless the mixture must be cooled in order to separate one or more of its components. In spite of the considerable cost of cryogenic operations, the procedure has been employed commercially for the separation of ethylene from other gaseous materials such as ethane and methane.

Copending patent application Ser. No. 252,607 filed May 12, 1972, in the names of Edward F. Steigelmann and Robert D. Hughes, is directed to a method for separating aliphatically-unsaturated hydrocarbons from mixtures containing them, and involves the combined use of liquid barrier permeation and metal complexing techniques which can exhibit high selectivity factors. In the process the liquid barrier is an aqueous solution containing metal ions which will complex with the aliphatically-unsaturated hydrocarbon to be separated. In one form of the system, the liquid barrier is disposed as a continuous, distinct or separate liquid phase adjacent to and in contact with a semi-permeable film membrane which is essentially non-selective with respect to passage of the components of the hydrocarbon feed mixture. Consequently, should the feed mixture contact the non-selective film forming the outlet or exhaust side for the unsaturated hydrocarbon separated, there is a tendency for all of the feed gas components to pass through the film and thereby contaminate the product and lower the selectivity of the separation. In the present invention an increase in the selectivity of the flooded-cell operation for separating the unsaturated material is obtained by providing a surface-active agent in the liquid barrier. This agent apparently serves to increase the wetting of the film membrane by the liquid barrier and reduce contact between the gaseous feed and the semi-permeable film to improve the selectivity of the separation of the unsaturated hydrocarbon, and the surface-active agent does so without causing the film to become permeable to the aqueous phase present.

The amount of surface-active agent in the liquid barrier is sufficient to provide a substantial increase in the selectivity of the separation of the aliphatically-unsaturated hydrocarbon, that is, the product separated is purer in the desired component than obtained when the surface-active agent is not employed. Although the selectivity of the unsaturated hydrocarbon separation may increase with an increase in the amount of surface-active agent in the liquid barrier, the concentration of this agent to be employed for best results may be affected by choice of film membrane and surface-active agent, as well as, the temperature of the system, the pressure drop across the film membrane during its use in the separation procedure, and the concentration of complex-forming metal ions in the solution. The amount of surface-active agent which may often be used is a minor amount of the solution of complex-forming metal ions, for instance, about 0.001 to 5 weight percent based on the total solution, and preferably about 0.01 to 1%.

The surface-active agents which may be employed in this invention are soluble in the liquid barrier and are essentially inert to the complexing metal solution and the gaseous mixture undergoing separation. The surface-active agents may be inorganic or organic, and the latter may be of the anionic, nonionic, cationic or amphoteric type. The organic surface-active agents generally have a hydrophobic portion and a hydrophilic portion in their molecules. The hydrophilic portion of the molecule may be termed the solubilizing group and in the anionic surface-active agents these groups are often carboxylates, sulfonates, sulfates or phosphates. In this invention the surface-active agents reduce significantly the interfacial tension between a one molar aqueous silver nitrate solution and white mineral oil by, for instance, at least about 10%, preferably at least about 50 or 90%, when the aqueous solution contains the surface-active agent in an amount not exceeding about 1%.

Typical anionic surface-active agents are carboxylic acids salts of amines and alkali metals, having about 10 to 20 carbon atoms in the acid radical; alkyl or alkylarylene sulfonic acid salts, such as the sodium salts of linear alkyl sulfonates of about 10 to 20 carbon atoms; petroleum sulfonates such as green soaps; dialkyl sulfosuccinates having alkyl groups of about 3 to 16 carbon atoms; naphthalenesulfonates such as alkylnaphthalene sulfonates; salts of sulfonated formaldehyde-naphthalene condensates; N-acyl-N-alkyltaurates such as sodium N-oleoyl-N-methyltaurate; 2-sulfoethyl esters of fatty acids such as the 2-sulfoethyl ester of lauric acid or coconut acids; α-olefin sulfonates formed by the sulfonation of a 1-olefin having from about 14 to 18 carbon atoms; sulfates and sulfated products such as sulfated alcohols (alkyl sulfates) of about 6 to 20 carbon atoms, e.g., the sodium, potassium, magnesium, ammonium and amine salts of lauryl sulfate; sulfated natural fats and oils especially from castor and sperm oils; sulfated oleic acid and the sodium and ammonium salts thereof; sulfated alkanolamides such as the mono- and diethanolamides of the fatty acids in the range of about 12 to 18 carbon atoms; sulfated esters of, for instance, the esterification products of oleic or ricinoleic acid with low-molecular-weight alcohols which are sulfated; sulfated polyoxyethylene alkylphenols having molecular weights in the range of about 500 to 10,000; alkyl-polyoxyethylene sulfates having an alkyl group of about 8 to 20 carbon atoms and a molecular weight of about 400 to 5,000; and alkyl orthophosphates and alkylpolyphosphates having from about 6 to 20 carbon atoms.

The nonionic surfactants include, for instance, polyoxyalkylene surfactants of a molecular weight of about 300 to 3,000, which are reaction products of alkylene oxides of, say, 2 to 4 carbon atoms with various hydroxy-containing organic compounds, often having about 6 to 30 carbon atoms. The hydroxy-containing compounds may be mono- or polyhydroxyl compounds of aromatic, aliphatic or mixed aliphatic-aromatic character. Examples of nonionic surfactants include ethoxylated alkylphenols such as polyoxyethylated about $C_6$ to $C_{14}$ alkylphenols; alkyl-poly(ethyleneoxy)alkanols such as the ethoxylated primary and secondary alcohols of about 8 to 20 carbon atoms; polyol-solubilized and polyoxyethylene-solubilized carboxylic acid esters such as the mono- or diglycerides of fatty acids, and polyoxyethylene fatty acid esters; fatty acid esters of anhydrosorbitol; ethoxylated anhydrosorbitol esters, glycol esters of fatty acids; ethoxylated natural fats, oils, and waxes; polyvinyl alcohols; carboxylic amides such as alkanol amine condensates of fatty acids and monoalkanol amine condensates of fatty acids; polyoxyethylene fatty acid amides including the mono- and di-adducts resulting from the ethoxylation of fatty acid amides; polyoxyalkylene oxide block copolymers such as the Pluronics which can be represented by the formula

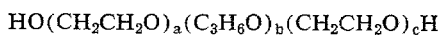

whence $b$ is at least 15 and $a$ and $c$ are such that the polyoxyethylene amounts to about 20 to 90% of the total weight; and polysiloxane-polyoxyalkylene copolymers.

The cationic surface-active agents may have amino or quaternary nitrogens as the hydrophilic moieties and are represented by the following: aliphatic mono-, di-, and polyamines such as N-alkyltrimethylenediamine wherein the alkyl group has about 8 to 20 carbon atoms; 2-alkyl-2-imidazolines and 1 - (2 - aminoethyl) - 2 - alkyl-2-imidazolines; amine oxides; polyoxyethylene alkyl amines; 1-(2-hydroxyethyl)-2-alkyl-2-imidazoline; N,N,N',N'-tetrakis-substituted ethylenediamine derivatives; condensation products of a carboxylic acid with a di- or polyamine wherein the carboxylic acid is of about 8 to 20 carbon atoms; and quaternary ammonium salts such as $C_8$ to $C_{20}$ alkylbenzyldimethylammonium chloride.

The amphoteric surface-active agents include amphoteric derivatives of polypeptides, alkyl-2-aminopropionates, alkyl-3-aminopropionates, and 2-alkyl-1-carboxymethyl-1-(2-hydroxyethyl)-2-imidazolinium salts. It may be desirable to employ mixtures of surface-active agents selected from one or more of the categories previously set forth, or to employ one or more cationic or anionic surface-active agents with one or more nonionic or amphoteric surface-active agents.

Among the inorganic surface-active agents which are useful in this invention are the alkali metal salts, for instance, of sodium or potassium, such as their carbonates, phosphates, borates, bicarbonates, silicates, sulfates and their mixtures. For example, these surface-active agents may be one or more compounds such as sodium metasilicate, potassium pyrophosphate, sodium silicate, potassium carbonate, sodium tripolyphosphate, and the like.

The film membranes employed in the process of this invention are of the essentially solid, water-insoluble, semi-permeable type. The film itself is not adequately selective with respect to passage of or permeation by the aliphatically-unsaturated hydrocarbon to perform the desired separation, and often the film is permeable to essentially all of the components in the feedstock used in this invention when they are in the gaseous phase. However, by having the film in contact with sufficient aqueous liquid to form a barrier the physical passage of gas through the film is reduced or prevented, and the components of the feed stream must therefore traverse the separation zone primarily through becoming part of and then being separated from the aqueous liquid phase. Thus in the absence of the complex-forming metal ion in the aqueous medium, there could be a slight separation of hydrocarbons effected by the use of water as the liquid medium since the individual hydrocarbons may exhibit differing solubilities in water. In the method of the present invention, however, the selectivity of the separation of aliphatically-unsaturated hydrocarbons is greatly increased due to the presence of the complex-forming metal ions in the aqueous barrier medium contacting the film.

The film membranes which can be employed in this invention serve to prevent the passage of significant amounts of the liquid complexing solution through the film under the conditions at which the operation is conducted. Since an aqueous medium is employed in this system the film may exhibit hydrophilic characteristics and be essentially unreactive with the complexing ions in the liquid barrier. The films can be readily made and some are commercially available. The film membrane may be self-supporting and have sufficient strength not to require any additional supporting material on either of its sides during use. With some films, however, it is necessary or advantageous to provide adequate support such as additional film or sheet-like materials on one or both sides of the film membrane. These supporting structures are frequently very thin materials and are usually permeable to both liquids and gases and may not serve a separating function with respect to any component of the feed stream.

The film membrane may be in any desirable physical shape. Flat film sheets are one useable form, although greater surface areas and more efficient separation may be provided by using tubular fibers of the types disclosed in, for instance, U.S. Pat. No. 3,228,877, herein incorporated by reference. This patent describes a variety of hydrophobic or hydrophilic hollow fibers which may be employed in the present invention, for example, those of cellulose acetate, nylon, polyvinyl chloride, polyvinyl alcohols, olefin polymers such as polyethylene, polypropylene, and ethylene-propylene copolymers, and the like. Suitable membranes are described in "Gas Permeability of Plastics," Major et al., Modern Plastics, page 135 et seq., July 1962; and U.S. Pats. Nos. 3,133,132; 3,133,137; 3,256,675; 3,274,750; 3,325,330; 3,335,545; 3,396,510 and 3,447,286, all incorporated herein by reference. The film membranes may often have a thickness up to about 10 mils or more, and it is preferred to employ membranes having a thickness up to about 1 mil or even up to about 5 mils. The film must have sufficient thickness to avoid rupture at the pressure employed, and often the films may have a thickness of at least about 0.001 mil.

The method of this invention can be employed alone to separate one or more unsaturated hydrocarbons, or it may be used in conjunction with other separating steps, for instance, a cryogenic operation, and still be economically advantageous compared with an all-cryogenic system. Although the aliphatically-unsaturated hydrocarbon product provided by the method of this invention may be a quite pure material, for instance, of greater than 99% purity, the separation procedure may be used merely to provide a significant increase in the concentration of a given aliphatically-unsaturated hydrocarbon in a mixture with other components of the feedstock.

The process of this invention can be employed to separate various aliphatically-unsaturated hydrocarbons from other ingredients of the feed mixture providing at least one of the aliphatically-unsaturated hydrocarbons exhibits a transfer rate through the liquid barrier that is greater than at least one other dissimilar component of the feedstock. Quite advantageously, the system can be used to separate aliphatically-unsaturated hydrocarbons from other hydrocarbons which may be aliphatically-saturated or unsaturated, or from non-hydrocarbon materials, including fixed gases such as hydrogen. The feed mixture may thus contain one or more paraffins, including cycloparaffins, mono or polyolefins, which may be cyclic or acyclic, and acetylenes or alkynes, and the mixture may include aromatic structures having such aliphatic configurations in a portion of their structure. Often the feed mixture contains one or more hydrocarbons having the same number of carbon atoms as the unsaturated hydrocarbon to be separated or only a one carbon atom difference. Among the materials which may be separated according to this invention are ethylene, propylene, butenes, butadiene, isoprene, acetylene and the like.

In flooded-cell operations of this invention the liquid barrier can be formed by using the semi-permeable membrane to immobilize the liquid barrier as a distinct, continuous liquid phase adjacent to the feed side of the membrane. The gaseous feedstock can then be contacted with the liquid layer, and the liquid barrier is generally sufficiently thick so that the hydrocarbon feed gas can be passed into the layer of liquid without being in immediate or excessive contact with the film. Accordingly, there is little, if any, passage for the gaseous feedstock across the separation zone except by becoming part of the liquid barrier phase, and thus this barrier controls the selectivity of the liquid barrier-semi-permeable membrane combination.

The liquid barrier contains sufficient water-soluble metal ions to form a suitable complex with at least one aliphatically-unsaturated hydrocarbon component of the gaseous feed. The metal ions readily form the complex upon contact with the gaseous feed, and, in addition, the complex is converted back to the metal ion and an aliphatically-unsaturated hydrocarbon component of the complex, under the conditions which exist at the discharge side of the liquid barrier and semi-permeable membrane as employed in this invention. The released aliphatically-unsaturated hydrocarbons exit the discharge side of the membrane and can be removed from the vicinity of the membrane as by a sweep gas or through the effect of vacuum on this side of the membrane. Thus the unsaturated hydrocarbon-metal complex forms and is decomposed upon its travel through the metal ion-containing liquid barrier, and as a result the material passing through the barrier is more concentrated with respect to at least one aliphatically-unsaturated hydrocarbon component present in the feed stream.

Often the reactivity of aliphatically-unsaturated hydrocarbons with the complex-forming metal ions in their order of decreasing activity goes from acetylenes or dienes to monoolefins, the aliphatically-saturated hydrocarbons and other materials present being essentially non-reactive. Also different reactivities may be exhibited among the various members of a given type of aliphatically-unsaturated hydrocarbons. The process of this invention can thus be used to separate paraffins from monoolefins, diolefins or acetylenes; diolefins from monoolefins; or acetylenes from paraffins, monoolefins or diolefins; as well as, to separate a given aliphatically-unsaturated hydrocarbon from another of such materials in the same class providing the members have differing transport rates across the liquid barrier. The feed gas need only contain a small amount of aliphatically-unsaturated hydrocarbon, as long as the amount is sufficient so that the unsaturated material to be separated selectively reacts with the metal complex ions to a significant extent, and thus at least one other component of the feed is less reactive or non-reactive with the complex-forming metal ions. The aliphatically-unsaturated materials of most interest with regard to separation by the method of the present invention, have 2 to about 8 carbon atoms, preferably 2 to 4 carbon atoms. The separation of ethylene or propylene from admixtures with other normally gaseous materials, such as one or more of methane, propane and hydrogen, is of particular importance. Frequently these feed mixtures contain about 1 to 50 weight percent ethylene, about 0 to 50 weight percent ethane and about 0 to 50 weight percent methane. Propylene is an olefin in high demand, and its separation may be accomplished in accordance with the present invention. Another process that may be of special significance is the separation from ethylene of minor amounts of acetylene.

The partial pressure of the aliphatically-unsaturated component of the gaseous feed at its charged or input side of the liquid barrier used in the present invention is greater than the partial pressure of this unsaturated component on the discharge or exit side of the liquid barrier and semi-permeable film. The partial pressure drop of the unsaturated hydrocarbon may often be at least about 0.5 pound per square inch, and is preferably at least about 20 p.s.i. Conveniently, the total pressure of the gaseous feed is up to about 1000 pounds per square inch, although the pressure drop should not be so great that the membrane is ruptured or otherwise deleteriously affected to a significant extent. The discharge partial pressure of the unsaturated hydrocarbon can preferably be controlled by subjecting the exit side of the membrane to the action of a sweep gas that is essentially inert to forming a complex with the metal ions of the aqueous solution in liquid barrier. The sweep gas picks up the discharged aliphatically-unsaturated components, and the sweep gas may be selected so that it can be readily separated from the aliphatically-unsaturated hydrocarbon material if that be necessary for the subsequent use of the unsaturated hydrocarbon separated. Unless a reaction with the separated hydrocarbon is desired, the sweep gas should be relatively inert therewith and may be, for instance, butane, carbon dioxide or the like.

The temperature across the liquid barrier-semi-permeable film combination employed in the method of this invention can be essentially constant or it may vary, and decomposition of the metal-unsaturated hydrocarbon complex can be effected primarily by the drop in partial pressure of the aliphatically-unsaturated hydrocarbon on the exit side of the liquid barrier-semi-permeable film combination compared with that on the feed side. Conveniently, the temperature of the liquid barrier may be essentially ambient in the case of feed-stocks that are gaseous at this temperature and the pressure employed on the feed side of the liquid barrier. The temperature of the liquid barrier may, however, be reduced or elevated from ambient temperature. Often the temperature may be up to about 100 degrees C., and elevated temperatures may even be required to put the feedstock in the gaseous or vapor phase. Neither the temperature nor the pressure used should, however, be such as to destroy the difference in transport rate across the liquid barrier-semi-permeable film combination of the aliphatically-unsaturated hydrocarbons whose separation is sought, compared with that of the other components of the feed. These conditions should also not be such that physical disruption of the membrane or any other significant malfunction results.

In the present invention we may use the metals which serve in the form of metal-containing cations to separate aliphatically-unsaturated hydrocarbons in the feed mixture through the formation of metal complexes of desired properties, and these metals include, for instance, the transition metals of the Periodic Chart of Elements having atomic numbers above 20. Included in these metals are those of the first transition series having atomic numbers from 21 to 29, such as chromium, copper, especially the cuprous ion, manganese and the iron group metals, e.g. nickel and iron. Others of the useful complex-forming metals are in the second and third transition series, i.e. having atomic numbers from 39 to 47 or 57 to 79, as well as mercury, particularly as the mercuric ion. Thus we may employ noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complexing-forming metals may also be employed in this invention, either in the presence or absence of other non-metal or non-complexing metal cations.

The metal is provided in the aqueous liquid barrier in contact with the semi-permeable membrane in a form which is soluble in this liquid. Thus the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes. The metal salts should not react with any components of the aliphatically-unsaturated hydrocarbon-containing feed to form an insoluble material which could block the film membrane or otherwise prevent the separation of the desired component of the feedstock. Also in a given system, the metal is selected so that the complex will readily form and yet be sufficiently unstable so that the complex will decompose and the dissociated unsaturated hydrocarbon leave the liquid barrier, thereby providing a greater concentration of the aliphatically-unsaturated hydrocarbon to be separated from the exit side of the membrane than in the feed. The concentration of the metal ions in the liquid barrier may be rather low and still be sufficient to provide an adequate complexing rate so that excessive amounts of the semi-permeable membrane surface will not be needed to perform the desired separation. Conveniently, the concentration of the complex-forming metal ions in the aqueous solution forming the liquid barrier is at least about 0.1 molar, and is preferably about 0.5 to 12 molar. Advantageously, the solution is less than saturated with respect to the complex-forming metal ions to insure that essentially all of the metal stays in solution, thereby avoiding any tendency to plug the film membrane and destroy its permeability characteristics.

When the complexing ions in the liquid barrier employed in this invention are cuprous ions, ammonium ions can be used to provide copper ammonium complex ions which are active to form a complex with the aliphatically-unsaturated hydrocarbons to be separated. We preferably supply about equimolar amounts of cuprous and ammonium ions in the liquid barrier solution, although either type of ions may be in excess. The ammonium ions can be provided in various convenient ways, preferably as an acid salt such as ammonium chloride. In order to enhance the selectivity of the copper ammonium ion complex in the separation of this invention, we may also make the liquid barrier solution more acidic, by, for instance, providing a water-soluble acid such as a mineral acid, especially hydrochloric acid in the solution. Preferably, the pH of the liquid barrier in this form of the invention is below about 5 with the acid in the solution. Since silver may form undesirable acetylides with acetylenes, the copper ammonium complex may be a more attractive complexing agent when it is desired to separate acetylenes from its various mixtures.

Instead of supplying only a noble metal for complexing the aliphatically-unsaturated hydrocarbon in the process of this invention, we may also employ mixtures of noble metal and other cations. Work has shown that as the noble metal concentration increases the selectivity of the desired separation may be enhanced, and a portion of the noble metal may be replaced by non-noble metal or ammonium ions and selectivities generally comparable to those obtained with the same concentration of noble metal ions may be obtained. This result has been reached even though the non-noble metal or ammonium ion when used by itself in an effort to accomplish the desired separation, may be ineffective or only marginally suitable. Accordingly, the total of such ions in the liquid barrier may be composed of a minor or major amount of either the noble metal ions or the non-noble metal, ammonium or other cations. Solutions having a major amount of the non-noble metal, ammonium or other cations will generally be less expensive, and accordingy, the noble metal may be as little as about 10 molar percent or less of the total cations in the solution. To reduce expenses at least about 10 molar percent, preferably at least about 50 molar percent, of the total cations may be other than the noble metal cations. The non-noble or base metals are preferably of Groups II to VIII of the Periodic Chart of Elements, and especially those in the fourth and fifth periods, aluminum and magnesium. Zinc and cupric ions are preferred ones among these non-noble or base metal ions. The various cations may be provided in the liquid barrier in the form of any suitable compound such as the acid salt forms mentioned above with respect to the noble metals.

The amount of water in the liquid barrier employed in this invention may be a minor portion of the liquid phase, but preferably is a major portion or even essentially all of the liquid, on a metal salt-free basis. Thus small or minor amounts of water, say as little as about 5 weight percent, on a salt-free basis in the liquid phase may serve to provide significant transport for the aliphatically-unsaturated hydrocarbons across the liquid barrier. Any other liquid present in the barrier is preferably water-miscible and should be chosen as not to have a substantial deleterious effect on the separation to be accomplished.

The method of this invention will be further described with reference to the following specific examples.

EXAMPLE I

A closed, glass test cell was equipped with a gas inlet tube passing through the cap of the cell and extending to close to the bottom of the cell where the tube ended in a fritted gas bubbler within the liquid phase of the cell. The cell internal cross-sectional area was 4.9 cm.$^2$ and the length was 20 cm. The gas inlet tube was surrounded at its upper end with a feed gas outlet tube whose lower end opened into the upper part of the cell at a point just below the cell cap and above the liquid level in the cell. A separate tube for exhausting permeate gas from the cell extended nearly the length of the cell and was immersed in the liquid for most of the length of the tube. The permeate outlet tube passed through the cell cap. This tube housed a smaller purge gas inlet tube that opened into the lower portion of the permeate outlet tube. Thus during operation the purge gas swept essentially the entire length of the inside of the permeate outlet tube.

The hydrocarbon feed gas was charged into the aqueous liquid in the cell by way of the gas bubbler, and the exhaust or raffinate components of the gas left the cell by the gas outlet tube. The permeate outlet tube was a ¼" O.D. Selas tube having pores of 0.27 micron in diameter. The outside of the Selas tube was covered with a cured coating of silicone-rubber resin (General Electric RTV-60, trademark), to form a semi-permeable membrane of apparent thickness of less than 5 mils, most probably between 4 and 4 mils thick. The portion of the Selas tube above the liquid level was sealed so that exhausted feed gas would not enter the permeate outlet tube.

The cell was filled except for a small volume just below its cap, with an aqueous solution of 1 M silver nitrate. The sweep gas contacted the inside surface of the permeate gas outlet tube, picked-up the materials leaving the membrane and then exited the cell as a product stream. The product was analyzed by gas chromatography. Permeation rates were calculated from the amount of hydrocarbon in the sweep gas, the sweep gas flow rate, and the response of the gas chromatographic detector to one milliliter of the product gas mixture. The test was run over a 2-hour period with the cell and gases at ambient temperature.

The cell was used to separate ethylene from a mixed hydrocarbon gas stream while employing silver ions as the complexing metal. The feed gas was a mixture of methane, ethane and ethylene, and the gas was fed to the cell at 15 p.s.i.g. and was allowed to exit the cell at the rate of 5 ml./min. The back side of the membrane tube was swept with helium at the rate of 10 ml./min. In one test approximately 0.1 weight percent of Tide (trademark) detergent composed of sulfonated lauryl alcohol, alkylaryl sulfonate, and polyphosphate alkaline detergent builder, was incorporated in the liquid complexing solution while in the other run no surface-active agent was added. The results of these tests were as follows:

TABLE I

| Liquid complexing solution | Composition of permeate, weight percent, helium-free basis | | | S.F.[1] |
|---|---|---|---|---|
| | $CH_4$ | $C_2H_4$ | $C_2H_6$ | |
| Feed gas composition | 26.2 | 43.8 | 30.0 | |
| 1 M $AgNO_3$ | 3.0 | 86.9 | 10.1 | 9.1 |
| 1 M $AgNO_3$ plus surface-active agent | 1.8 | 94.4 | 3.8 | 23.3 |

[1] S.F. = Ethylene selectivity factor =

$$\frac{\text{Conc. of } C_2H_4 \text{ in permeate}}{\text{Conc. of } CH_4+C_2H_6 \text{ in permeate}} \times \frac{\text{Conc. of } CH_4+C_2H_6 \text{ in feed}}{\text{Conc. of } C_2H_4 \text{ in feed}}$$

The data show that the ethylene selectivity factor in the test using the surface-active agent was increased more than 2-fold compared with the other run.

EXAMPLES II-VII

A system similar to that of Example I was employed to separate ethylene from a hydrocarbon mixture in the presence of a variety of surface-active agents. The apparatus was in essence the same as in Example I, except that the Selas tube had pores of 0.8 micron in diameter. The coating of silicone-rubber resin on the tube had a thickness of 3.5 mils. The membrane area was 20.7 square centimeters. The complex-forming solution was 1 M silver nitrate and the feed gas was fed at the rate of 10 ml./min. at 30 p.s.i.g. In one run the solution did not contain a surface-active agent while different ones of such agents were used in five other runs. The results from these runs are given in Table II.

TABLE II

| Surface-active agent | | Permeation rate, ml./$cm.^2$-min. | Permeate composition, wt. percent (helium-free) | | | S.F. |
|---|---|---|---|---|---|---|
| Identity | Wt. percent of solution | | Methane | Ethane | Ethylene | |
| Feed composition | | | 18.5 | 32.1 | 49.4 | |
| None | | 0.022 | 3.7 | 12.3 | 83.9 | 4.9 |
| Para-t-octyl-phenyl-$(OCH_2CH_2)_{9-10}OH$ | 0.85 | 0.023 | 2.4 | 5.0 | 92.6 | 11.8 |
| Na lauryl sulfate | 0.077 | 0.004 | 2.1 | 4.0 | 93.9 | 14.6 |
| Polyvinyl alcohol (0-0.5% acetate content) | 0.23 | 0.017 | 1.1 | 2.6 | 96.3 | 29.8 |
| Na tripolyphosphate ($Na_5P_3O_{10}$) | 0.83 | 0.021 | 1.6 | 3.4 | 95.0 | 19.4 |
| Surf (trademark) detergent [1] | 0.075 | 0.019 | 1.7 | 3.4 | 94.9 | 17.8 |

[1] Detergent formulation composed of an alkylaryl sulfonate plus an alkaline detergent builder.

These results show the advantageous selectivity for the separation of ethylene obtained when the solution of complexing-forming metal ions contains a water-soluble surface-active agent in accordance with this invention.

It is claimed:

1. A method for separation of aliphatically-unsaturated hydrocarbon of 2 to about 8 carbon atoms which comprises contacting a vaporous mixture containing said unsaturated hydrocarbon with an aqueous liquid phase in contact with a first side of an essentially solid, water-insoluble, semi-permeable film membrane, said semi-permeable film membrane being permeable to said vaporous mixture and essentially impermeable to said aqueous liquid, said liquid phase having therein metal ions which combine with said unsaturated hydrocarbon to form a water-soluble complex, the partial pressure of said unsaturated hydrocarbon on a second side of said semi-permeable membrane being sufficiently less than the partial pressure of said unsaturated hydrocarbon in said vaporous mixture to provide said separated unsaturated hydrocarbon on said second side of said semi-permeable membrane, said aqueous liquid containing a sufficient amount of a water-soluble, surface-active agent to increase the selectivity of the separation of said unsaturated hydrocarbon, and removing said unsaturated hydrocarbon from the vicinity of said second side of said semi-permeable membrane.

2. The method of claim 1 in which said surface-active agent is an ethoxylated surfactant having a molecular weight of about 300 to 3000.

3. The method of claim 1 in which the said unsaturated hydrocarbon separated has 2 to 4 carbon atoms.

4. The method of claim 3 in which said unsaturated hydrocarbon separated is ethylene.

5. The method of claim 4 in which the vaporous mixture contains ethylene in admixture with one or both of methane and ethane.

6. The method of claim 5 in which the surface-active agent is selected from the group consisting of ethoxylated alkyl phenols, sodium alkyl sulfates, polyvinyl alcohol and sodium phosphates.

7. The method of claim 1 in which the said metal ions are noble metal ions.

8. The method of claim 7 in which said metal ions are silver.

9. The method of claim 7 in which said unsaturated hydrocarbon separated has 2 to 4 carbon atoms.

10. The method of claim 9 in which the unsaturated hydrocarbon separated is ethylene.

11. The method of claim 10 in which the vaporous mixture contain ethylene in admixture with one or both of methane and ethane.

12. The method of claim 11 in which said surface-active agent is an ethoxylated surfactant having a molecular weight of about 300 to 3000.

13. The method of claim 11 in which the amount of surface-active agent is about 0.01 to 1% of said liquid phase.

14. The method of claim 13 in which the surface-active agent is selected from the group consisting of ethoxylated alkyl phenols, sodium alkyl sulfates, polyvinyl alcohol and sodium phosphates.

References Cited

UNITED STATES PATENTS

| | | | |
|---|---|---|---|
| 3,133,132 | 5/1964 | Loeb et al. | 264—49 |
| 3,256,675 | 6/1966 | Robb | 55—16 |
| 3,335,545 | 8/1967 | Robb et al. | 55—16 |
| 3,396,510 | 8/1968 | Ward III et al. | 55—16 |

DELBERT E. GANTZ, Primary Examiner

J. M. NELSON, Assistant Examiner

U.S. Cl. X.R.

55—16; 260—679 A, 681.5